Patented Nov. 26, 1940

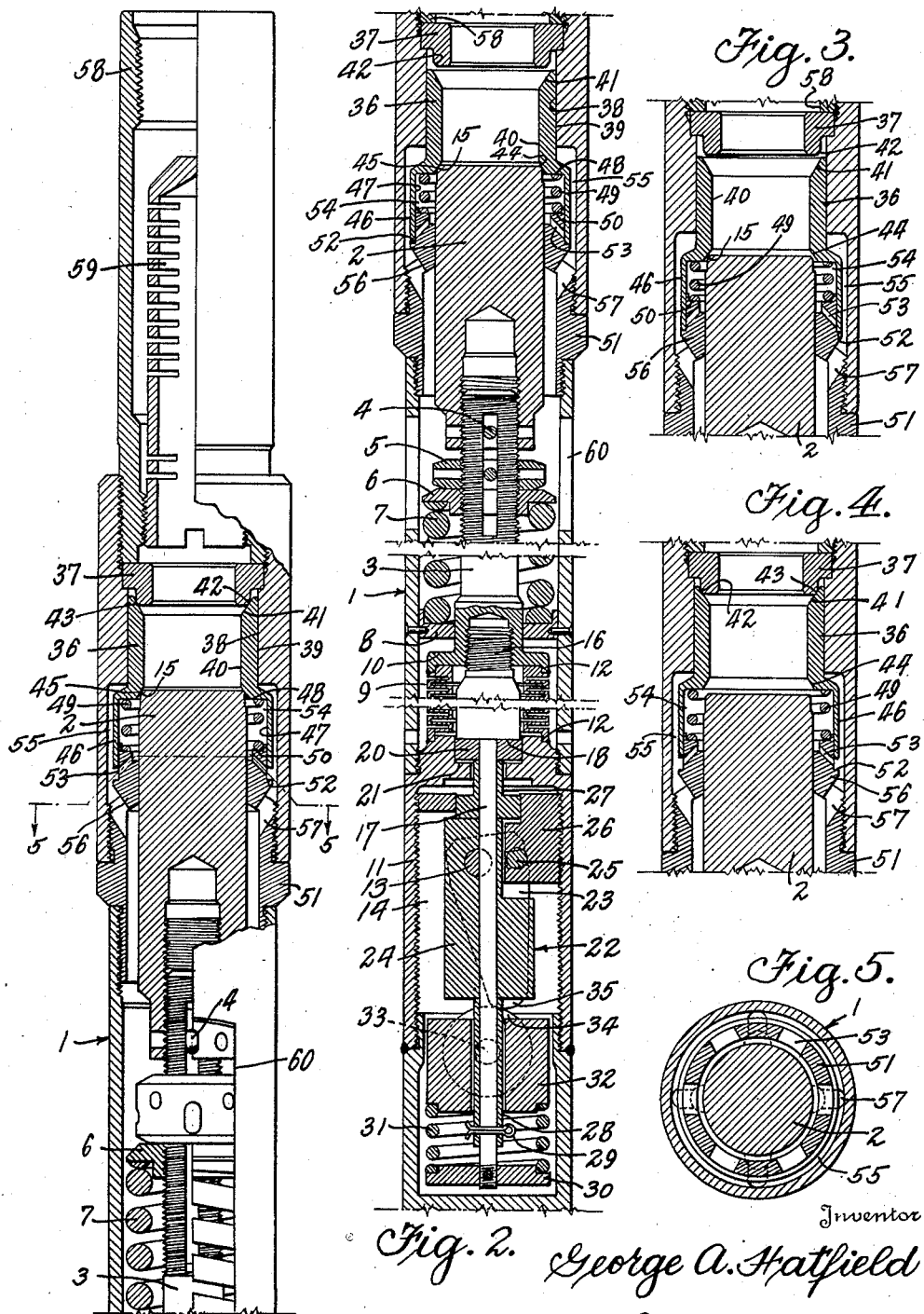

2,223,337

UNITED STATES PATENT OFFICE 2,223,337

PRESSURE ACTUATED VALVE

George A. Hatfield, Los Angeles, Calif., assignor to The National Supply Company, Pittsburgh, Pa., a corporation of Pennsylvania Application November 12, 1938, Serial No. 239,970

14 Claims. (Cl. 277—44)

This invention relates to a gas lift pumping apparatus for wells, and is more particularly directed to the general type of such apparatus as is illustrated in my co-pending application, Serial No. 175,015, for valve for Gas lift pumping apparatus, and is particularly directed to an improvement in the valve structure therein illustrated and claimed.

In gas lift apparatus of the intermitting type where gas under pressure is used for lifting the well fluid from the well to the surface, an intermitting valve may be positioned within the well and controlled by the fluid pressure of the gas from the surface of the well.

For efficient operation in this type of pressure actuated gas lift apparatus, it is often desired to maintain the "spread" between opening and closing pressures of the valve at a low value. A relatively small spread is desirable because under these conditions, actuating gas is conserved, and the pressure in the supply conduit at the surface may be maintained at a relatively constant value. It is, however, important in the operation of such a gas lift apparatus that the valve have definite opening and closing characteristics so that it will snap open quickly and completely at the opening pressure and will likewise close in the same fashion at the closing pressure. This requirement of quick opening and closing is met through the provision of a snap action mechanism which acts resiliently to hold the valve plunger in its fully opened or fully closed position, thereby increasing the spread between the opening and closing pressures.

In accordance with my present invention, the valve mechanism utilized in the gas lift apparatus is very similar to that disclosed in my co-pending application above referred to, and my present invention is particularly directed to the interpositioning in such a valve mechanism of a mechanism which is initially actuated by the gas under pressure so that as the actuation of this mechanism occurs, a greater pressure area is made available to the gas under pressure so that the gas under pressure in its operation of opening the valve operates at the instant of opening on an increased area whereby the pressure of the actuating gas is utilized over a larger area to quickly open the valve.

It is therefore an object of this invention to provide a pressure actuated valve which opens suddenly and completely when the pressure of the actuating gas reaches a predetermined intensity and which valve remains fully open during flow of said actuating gas and which valve closes positively when the pressure of the gas falls below the predetermined value.

Another object of this invention is to provide a pressure actuated valve having a supplementary opening member which acts to throw the valve fully open upon the valve starting to open, but which does not affect the action of the valve during flow or at closing.

Another object of this invention is to provide a pressure actuated valve having an intermediate member interposed between a movable plunger and a stationary seat, which intermediate member on movement makes available additional area to the gas under pressure to assist in moving the valve plunger to its open position, yet does not affect the action of the valve plunger during flow or at closing thereof.

Another object of this invention is to provide an intermediate member which forms a relatively large diameter seal with the stationary seat and a relatively small diameter seal with the movable valve plunger and in which the initial opening of the valve occurs at the former seal and the final closing at the latter seal.

Another object of the present invention is to provide a pressure actuated valve for a gas lift apparatus wherein the spread between the opening and closing pressures may be kept at low value without reducing the positive quick opening and quick closing action of the valve.

Other objects and advantages of this invention it is believed will be apparent from the following detailed description of a structure illustrative of my invention.

In the drawing:

Figure 1 is an elevation partly in vertical section showing the parts of the pressure actuating valve of my invention and illustrating the valve in its fully closed position.

Figure 2 is a sectional elevation showing the valve mechanism in complete assembly and wherein the valve is illustrated in the position where opening is beginning.

Figure 3 is a fragmental sectional view illustrating the position of the valve parts in the instant where the plunger reaches its lowest operative position.

Figure 4 is a view similar to Figure 3 illustrating the valve parts when the valve is in its fully open position.

Figure 5 is a sectional end view taken substantially on the line 5—5 of Figure 1.

In the drawing I have chosen to illustrate only such portions of the valve assembly as is particularly pertinent to my present invention. The location and particular manner of connecting the valve structure and its supporting and casing structure are specifically illustrated in my co-pending application, Serial No. 175,015, heretofore referred to, to which application reference is particularly made for such purposes of illustration.

In the structure as shown, the valve includes a body 1 which is of cylindrical form so that the entire valve assembly may be located within the customary well tubing and casing as commonly found in oil or other similar wells.

Slidably mounted for limited movement within the body 1 is a valve plunger 2 which is adjustably secured to the valve stem or shank 3 by means of a pin 4 which fixes the threaded connection between the plunger 2 and shank 3. Adjustably threaded to the shank 3 is a nut 5 which adjustably fixes the position of the compression spring collar 6 at the upper end of the compression spring 7. The lower end of the compression spring 7 rests upon the stationary support 8 positioned within the body 1. A bellows 9 is positioned within the body 1 and is secured to a shoulder 10 formed on the shank 3. The lower end of the bellows 9 is secured to the housing 11 and each of these points of connection is formed with a pressure-tight seal 12. The housing 11 is secured to the lower end of the body 1 and forms a continuation of said cylindrical body whereby the body 1 and housing 11 function as an integral unit.

The housing 11 is hermetically sealed to form a constant pressure chamber 14 within its interior. It will be noted that this chamber 14 extends up within the interior of the bellows 9. In this construction if desired the parts may be proportioned such that the effective area of the bellows 9 is substantially equal to the effective area of the seat 42 of the stationary seating element 37. In this case the action of the valve plunger 2 is unaffected by well pressure within the body 1 between the seat 15 and the housing 11 because such well pressure acts upwardly against the plunger 2 and downwardly against the shoulder 10 with equal force. Variations in these effective areas may, of course, be made in order to overcome friction set up in movement of the parts or other factors which may make it desirable to proportion the effective area of the bellows 9 with reference to the effective area of the seat 42 slightly different from that of substantial equal area.

The pressure within the chamber 14 remains at a substantially constant value throughout the operation of the device. Normal movement of the upper end of the bellows 9 causes such a small change in volume compared with the total volume of the chamber 14 that the pressure change within the chamber 14 due to this movement is negligible.

Secured to the shank 3 by the threaded connection 16 is a shank extension 17 which projects upwardly inside of the bellows 9 and within the constant pressure chamber 14.

A shoulder 18 is formed on the shank extension 17 and this shoulder 18 contacts a stop 20 which in turn engages an abutment 21 on the housing 11 to limit the downward movement of the shank extension 17, shank 3 and plunger 2. Within the constant pressure chamber 14 is the snap action mechanism 22 which cooperates with the shank extension 17 to assist in controlling the action of the valve plunger 2. In the sectional illustration in Figure 2 wherein this snap action mechanism is illustrated, only one-half of the same is seen but the parts falling on the other side of the section not illustrated are duplicates of those specifically illustrated so that this snap action mechanism comprises a pair of cams 23, only one of which is illustrated, which cams are pivotally mounted upon the cage 24 and are arranged to oscillate about a pin 25 secured in the stationary holder 26. The pin 29 extending through the spacer 28 and shank 17 serves to clamp the cage 24, spacer 28 and stop collar 20 against the shoulder 18 whereby the cage 24 moves with the shank extension 17.

The adjustable nut 30 is threadedly secured upon the lower end of the shank 17 and carries the spring 31 upon which is supported the roller support 32. Rollers 34 are provided in duplicate on the support 32 to engage the duplicate cams 23, there being illustrated one of such rollers 34 which is supported by a pin 33.

As illustrated in Figure 2, downward movement of the plunger 2 causes the noses 35 of the cams 23 to move from left to right over the rollers 34. This action occurs because the pivot pins 13 which connect the cams 23 to the cage 24 move vertically with the cage 24 and shank 17, and therefore the cams 23 must oscillate about the stationary axis of the pins 25. The pins 25 constitute the only part of the snap action mechanism 22 that does not reciprocate vertically with the plunger 2. The force of the spring 31 acting through the medium of the carrier 32 and rollers 34 provides the resistance to the transverse movement of the nose 35 of the cams 23. The degree of resistance may be regulated by turning the nut 30 relative to the shank 17, thus regulating the compression of the spring 31. The relation of the various parts of the snap action mechanism 22 is such that a greater force is required to start movement of the plunger 2 from either of its extreme end positions than is required at any intermediate point in its travel, and consequently when the plunger 2 once begins to move, the resistance offered by the snap action mechanism 22 immediately decreases and the plunger 2 moves quickly to fully open or fully closed position. It will be apparent that the compression spring 31 acts vertically at all times to maintain the valve plunger 2 closed when it is closed, and open when it is open. The construction as thus described of the snap action mechanism is similar to that illustrated in my prior application, Serial No. 175,015, hereinabove referred to.

In order to provide means for effecting a quicker opening of the valve plunger on a slight pressure differential which does not affect the closing characteristics of the valve or the flow of fluid through the valve during operation, I have provided between the plunger and its seat a supplementary opening device which includes the pilot member 36 which is slidably mounted within the body 1. The cylindrical bore 38 of the body 1 at this point cooperates with the annular wall 39 of the pilot 36 to guide the pilot axially of the body 1. The pilot member 36 has a central bore 40 which tapers outwardly at its upper end to form a seating surface 41 which is adapted to contact the tapered seating portion 42 of the stationary seat 37 forming at this point a pressure-tight seal 43.

The bore 40 of the pilot member 36 tapers outwardly at its lower end to form a seating surface 44 which is adapted to contact the tapered plunger seat 15 to form a pressure-tight seal 45.

Secured upon the pilot member 36 is a depending annular skirt 46 which overlaps the plunger 2 in telescopic relation and which has an inner diameter 47 which is greater than the outer diameter of the cylindrical guide 36. A shoulder 48 engages the upper end of a compression spring 49. The compression spring 49 rests upon an abutment 50 upon the throttle ring 51. The throttle ring 51 forms a portion of the body 1. A guide portion 56 at the upper end of the throttle ring 51 forms a sliding fit with the skirt 46 and plunger 2. There is formed on the throttle ring 51 a shoulder 52 which engages the lower end of the skirt 46 to limit downward movement of the pilot member 36. There is also formed in the throttle ring 51 above the shoulder 52 a series of throttle passages 53 which lead from the annular space 54 between the plunger 2 and skirt 46 and when uncovered by sliding movement of the skirt 46 on the throttle ring 51, establish communication between the space 54 and the annular space 55 within the body 1 on the outside of the skirt 46.

There is provided in the throttle ring 51 a plurality of ports or openings 57 which are formed below the shoulder 52 for establishing communication with the annular space within the body 1 below the throttle ring 51. The throttle ring 51 is secured to the upward collar forming the extension of the body 1, which collar in turn is secured to a pipe member 58 through the medium of which the valve assembly embodying my invention is suspended in the well. A gas strainer 59 is mounted in the member 58.

The structure embodying my invention operates: Gas under pressure is supplied through the suspending pipe into the member 58. The gas passes through the strainer 59 and exerts a downward pressure upon the pilot member 36 as well as upon the plunger 2. When the downward force exerted by the gas under pressure reaches a predetermined magnitude, the pilot member 36, together with the plunger 2, starts to move downwardly, opening the seal 43. The seal 43 opens before the seal 45 because it has a greater diameter. As soon as the seal 43 opens, that is, upon initial separation of the contacting surfaces 41 and 42, the pressure of the actuating gas is admitted within the cylindrical bore 38 above the pilot member 36, opening a larger area to the pressure effect of the gas under pressure. This increase in downward force, due to this larger unbalanced area, results in a rapid downward movement of the plunger 2 and the pilot 36 to the open position illustrated in Figure 2.

In accordance with the practice as it is now established, the compression spring 7 and bellows 9 are made sufficiently long so that the relatively small movement of the plunger 2 does not cause any appreciable change in the force exerted by them; also the snap action mechanism 22 is constructed so that it requires a greater force at the beginning of its movement than it does at any other position. Once started, it snaps quickly from one extreme position to the other. Therefore when the pressure of actuating gas reaches an intensity great enough to start downward movement of the pilot member 36 away from the stationary seat 37 against the combined resistance of the springs 7, bellows 9 and snap action 22, this movement continues and rapidly increases because the resistance of the spring and bellows remain substantially constant while the resistance of the snap action 22 decreases proportionately with the movement. Before the plunger 2 reaches the end of its movement, the lower end of the skirt 46 strikes the abutment 52, thereby halting downward movement of the pilot 36. At this time the resistance of the snap action mechanism 22 has been so greatly weakened that the pressure of the actuating gas, working over the smaller area of the plunger seat 15, is able to move the plunger 2 to its lowest operative position, thereby separating the surfaces 15 and 44 to open the seal 45.

The gas under pressure then enters the annular chamber 54, but is prevented from passing downward through the throttling passages 53 because the skirt 46 has closed off their outer ends. The member 36 and skirt 46, however, raise almost instantaneously because the inner diameter of the skirt 46 is greater than the diameter of the guide portion 38 on the body 1, and therefore has a greater effective area. This results in the opening of the throttle passages 53, as illustrated in Figure 4, permitting the gas under pressure to flow outwardly into the chamber 55. As the passages 53 have a throttling action on the actuating gas, the pressure in the chamber 55 is necessarily less than that in the chamber 54, resulting in pilot member 36 remaining in its uppermost position during flow. The pilot member 36 thus remains upwardly and does not drop as the actuating gas passes between the surfaces 15 and 14. The spring 49 is provided to offset the effect of gravity upon the pilot member 36, and to overcome any tendency of it to stick, but the spring 49 is not strong enough to have any appreciable effect upon the initial opening of the seal 43.

The actuating gas, passing through the chamber 55 downwardly through the openings 57, leaves the body 1 through the windows 60. The windows 60 act as exhaust ports and also permit accessibility to the nut 5 in order that the tension of the spring 7 may be adjusted. The gas passing out through the windows 60 passes under the fluid within the well, thereby lifting the same up through the pipe or casing within which the valve mechanism of my invention is mounted.

The valve remains in the fully opened position as long as the pressure of the actuating gas remains above a predetermined value. When the pressure drops below this predetermined value, the loading spring 7 moves the plunger 2 upwardly into contact with the pilot member 36 and closes the smaller seal 45. Once this movement is begun it is rapidly completed owing to the decreasing resistance of the snap action mechanism 22. The valve remains completely closed until the pressure of the actuating gas again rises to the predetermined magnitude.

Having fully described my invention as it is particularly shown in the illustration given, it is to be understood that my invention is susceptible of a wide range of modification within the scope of the appended claims.

I claim:

1. A pressure actuated valve comprising in combination, a stationary valve seat, a pair of separable valve elements reciprocably mounted, one of said elements being adapted to contact the seat to form a seal, said elements being adapted to move away from the seat as a unit, individual stop means adapted to sequentially arrest such movement of said elements, whereby their separation is effected, the separation of said elements acting to provide an opening for passage of a fluid, and means whereby said elements are caused to return toward said seat individually.

2. In a device of the class described, the combination of a body having a fluid pressure conduit associated therewith, a stationary valve seat in said body, a pair of separable valve elements reciprocably mounted in said body, one of said elements being adapted to contact the seat to resist flow of fluid from said conduit, said elements being adapted to move away from the seat as a single integral unit, upon increase in pressure in said conduit, individual stop means adapted to sequentially arrest such movement of said elements, whereby their separation is effected, the separation of said elements acting to provide an opening through which flow of fluid from said conduit may be established, and means whereby said elements are caused to return toward said seat individually.

3. In a device of the class described, the combination of a body having a fluid pressure conduit associated therewith, a stationary valve seat in said body, a pair of separable valve elements, one of said elements being adapted to contact the seat to resist flow of fluid from said conduit, individual stop means for said elements adapted to limit their travel in the direction away from said seat, the stop means for the seat-engaging element being adapted to arrest the movement of that element before the other element reaches the end of its travel, the separation of said elements acting to provide an opening through which flow of fluid from said conduit is automatically established.

4. In a pressure actuated valve, the combination of a stationary valve seat, a valve member reciprocably mounted for limited movement relative to said seat, a floating seat interposed between the valve member and the stationary valve seat, resilient means adapted to urge said valve member toward said stationary seat and thereby clamp the floating seat between the valve member and the stationary seat, the floating seat being adapted to remain in contact with the valve member during initial opening movement of the valve member away from said stationary seat, means acting automatically to return the floating seat into contact with the stationary seat upon the valve member reaching a predetermined position, the floating seat being adapted to remain in contact with the stationary seat during the period of flow through the valve, and during return movement of the valve member into contact therewith.

5. In a pressure actuated valve, the combination of a body having a fluid pressure conduit associated therewith, a stationary valve seat secured in said body, a valve member reciprocably mounted for limited movement relative to said body, a floating seat interposed between the valve member and the stationary valve seat, resilient means adapted to urge said valve member toward said stationary seat and thereby clamp the floating seat between the valve member and the stationary seat, to prevent flow of fluid from said conduit, the floating seat being adapted to remain in contact with the valve member during initial opening movement of the valve member under influence of pressure from said conduit, means acting automatically to return the floating seat into contact with the stationary seat upon the valve member reaching a predetermined position, the floating seat being adapted to remain in contact with the stationary seat during the period of flow of fluid from said conduit, and during final closing movement of the valve member under influence of said resilient means.

6. A pressure regulating valve assembly comprising in combination a movable plunger, a stationary seat, a floating seat slidably mounted between the plunger and the stationary seat and adapted to form a seal with both, resilient means adapted to urge said plunger toward said stationary seat and thereby clamp the floating seat between the plunger and the stationary seat to maintain both seals in closed position against the applied fluid pressure, the floating seat being adapted to move away from the stationary seat upon increase in applied fluid pressure, carrying the plunger therewith, stop means for said floating seat adapted to arrest its movement before the plunger reaches the end of its travel, in order that opening of the seal adjacent the plunger may be effected, means acting automatically to return the floating seat into contact with the stationary seat, upon opening of the latter seal, final closing of the valve assembly being adapted to occur upon decrease in applied fluid pressure, such closing being effected by the plunger moving into contacting engagement with the floating seat under the influence of the resilient means.

7. A pressure regulating valve, comprising in combination a movable plunger, a stationary seat, a floating seat slidably mounted between the plunger and the stationary seat and adapted to form a seal with both, resilient means adapted to exert a force on said plunger to maintain both seals in closed position against an applied fluid pressure, the outer seal adjacent the stationary seat having a greater effective area than the inner seal adjacent the plunger, whereby initial opening of the valve occurs at the outer seal when the applied fluid pressure reaches a predetermined intensity, stop means for said floating seat adapted to arrest its movement before the plunger reaches the end of its travel in order to effect opening of the inner seal, the force exerted by said resilient means being adapted to decrease as the floating seat and plunger move away from said stationary seat, whereby the same intensity of fluid pressure working over the smaller effective area of the inner seal may move the plunger to its fully open position.

8. A pressure regulating valve, comprising in combination a movable plunger, a stationary seat, a floating seat slidably mounted between the plunger and the stationary seat and adapted to form a seal with both, resilient means adapted to exert a force on said plunger to maintain both seals in closed position against an applied fluid pressure, the outer seal adjacent the stationary seat having a greater effective area than the inner seal adjacent the plunger, whereby initial opening of the valve occurs at the outer seal when the applied fluid pressure reaches a predetermined intensity, stop means for said floating seat adapted to arrest its movement before the plunger reaches the end of its travel in order to effect opening of the inner seal, the force exerted by said resilient means being adapted to decrease as the floating seat and plunger move away from said stationary seat, whereby the same intensity of fluid pressure working over the smaller effective area of the inner seal may move the plunger to its fully open position, and means acting automatically to return the floating seat into contact with the stationary seat.

9. In a valve structure of the class described, the combination of a body, a fluid pressure conduit communicating with said body, a plunger guided for movement within said body, a stationary seat fixed in said body and positioned between the plunger and the conduit, a floating seat slidably mounted between the plunger and the stationary seat and adapted to form a seal with both, the outer seal between the stationary seat and floating seat having a greater effective diameter than the inner seal between the floating seat and plunger, resilient means acting on said plunger and adapted to hold both seals in closed position, means associated with the plunger and the body acting to yieldably urge the plunger toward its closed position upon the plunger being moved adjacent its closed position, and also acting to yieldably urge the plunger toward its open position upon the plunger being moved adjacent its open position, whereby initial opening of the valve occurs upon opening of the outer seal under the influence of pressure from said conduit, and final closing of the valve occurs upon closing of the inner seal under the influence of said resilient means.

10. In a pressure actuated valve, the combination of a body, a fluid conduit communicating with said body, a plunger guided for movement within said body, a seat fixed in said body and positioned between the plunger and the conduit, an annular ring slidably mounted within the body between the plunger and the seat and adapted to form a seal with both, resilient means acting on said plunger and adapted to maintain both seals in closed position, the effective area of the first seal adjacent said seat being greater than the effective area of the second seal adjacent said plunger, whereby the first seal is the first to open upon increase in pressure in the fluid conduit, stop means adapted to arrest movement of the annular ring and thereby open the second seal, and means actuating automatically to close the first seal upon opening of the second seal.

11. In a pressure actuated valve, the combination of a body, a fluid conduit communicating with said body, a plunger guided for movement within said body, a seat fixed in said body and poistioned between the plunger and the conduit, an annular ring slidably mounted within the body between the plunger and the seat and adapted to form a seal with both, resilient means acting on said plunger and adapted to maintain both seals in closed position, the effective area of the first seal adjacent said seat being greater than the effective area of the second seal adjacent said plunger, whereby the first seal is the first to open upon increase in pressure in the fluid conduit, stop means adapted to arrest movement of the annular ring and thereby open the second seal, and means acting automatically to close the first seal upon opening of the second seal, said means including an annular skirt secured upon said annular ring and overlapping a portion of said plunger in telescopic relation, the inner diameter of the skirt being greater than the outer diameter of the annular ring.

12. In a valve structure of the class described, the combination of a body having a fluid pressure conduit communicating therewith, a valve seat fixed in the body, a plunger guided for movement within said body, an annular ring slidably mounted within the body and positioned between the plunger and the seat, resilient means acting upon said plunger and adapted to clamp the annular ring between the plunger and seat to resist flow of fluid from said conduit, a throttle ring on said body adapted to guide said plunger, a skirt on said annular ring overlapping said plunger in telescopic relation to form an annular chamber, the inner diameter of the skirt being greater than the outer diameter of the annular ring, a plurality of passages in said throttle ring communicating with said chamber, said skirt being adapted to close off said passages upon movement of the annular ring away from said seat.

13. A pressure regulating valve, comprising in combination a body having a fluid pressure conduit communicating therewith, a plunger slidably mounted axially of the body, a stationary seat mounted axially of the body and positioned between the plunger and the conduit, an annular ring slidably mounted axially of the body and interposed between the plunger and the seat, said body having a cylindrical bore adapted to contact the outer surface of the annular ring to form a guide, the annular ring having a central opening extending therethrough which tapers outwardly at each end, the plunger and seat each being adapted to cooperate with one of said tapered portions to form a seal, the seal adjacent the plunger having a diameter less than that of the seal adjacent the seat, and resilient means adapted to urge said plunger toward said seat to clamp the annular ring between the plunger and seat, whereby both of said seals are maintained in closed position against fluid pressure in said conduit.

14. In a pressure actuated valve, the combination of a plunger, a seat, a member slidably mounted between the plunger and the seat and adapted to contact both to resist an applied fluid pressure, said member being adapted to remain in contact with the plunger during its initial opening movement and to present a larger area to the pressure of the applied fluid immediately upon breaking contact with the seat, said larger area acting to increase the force of the applied pressure tending to move the plunger toward open position, means to separate the member and plunger, and means whereby the member may be automatically returned into contact with the seat upon such separation being effected.

GEORGE A. HATFIELD.